United States Patent
Vitor

(10) Patent No.: US 8,622,670 B2
(45) Date of Patent: Jan. 7, 2014

(54) THREE AEROGENERATOR BLADES PACKING SYSTEM (PACKING METHOD AND PACKING SYSTEM FOR THREE AEROGENERATOR BLADES)

(75) Inventor: Ismael Rodrigues Vitor, Sorocaba (BR)

(73) Assignee: Tecsis Technologia e Sistemas Avançados S.A., Sorocaba (BR)

( * ) Notice: Subject to any disclaimer, the term of this patent is extended or adjusted under 35 U.S.C. 154(b) by 28 days.

(21) Appl. No.: 13/140,673

(22) PCT Filed: Dec. 19, 2008

(86) PCT No.: PCT/IB2008/055475
§ 371 (c)(1),
(2), (4) Date: Sep. 7, 2011

(87) PCT Pub. No.: WO2010/070388
PCT Pub. Date: Jun. 24, 2010

(65) Prior Publication Data
US 2011/0308205 A1    Dec. 22, 2011

(51) Int. Cl.
*B60P 7/08* (2006.01)
(52) U.S. Cl.
USPC .............................. 410/44; 410/34; 410/120
(58) Field of Classification Search
USPC ................... 410/32, 34, 35, 44, 45, 53, 120; 280/404
See application file for complete search history.

(56) References Cited

U.S. PATENT DOCUMENTS

| 6,983,844 B2 | 1/2006 | O'Kane et al. |
| 8,322,954 B2 * | 12/2012 | Ten Thoren ............... 410/44 |
| 2005/0180833 A1 | 8/2005 | Almind |
| 2006/0251517 A1 | 11/2006 | Grabau |
| 2007/0199847 A1 | 8/2007 | Llorente et al. |

FOREIGN PATENT DOCUMENTS

| EP | 1849719 A1 | 10/2007 |
| EP | 1974995 A1 | 10/2008 |
| EP | 1997681 A2 | 12/2008 |
| WO | 2005071261 A1 | 8/2005 |
| WO | 2008004195 A2 | 1/2008 |
| WO | 2008004195 A3 | 1/2008 |
| WO | 2010070388 A1 | 6/2010 |

OTHER PUBLICATIONS

Office Action for Chinese Office Action 200880132415.7 Aug. 8, 2012.
International Searching Authority, "International Search Report and Written Opinion," issued in connection with International Patent Application No. PCT/IB2008/055475, mailed on Oct. 12, 2009.

\* cited by examiner

*Primary Examiner* — Stephen Gordon
(74) *Attorney, Agent, or Firm* — Sughrue Mion, PLLC

(57) ABSTRACT

A three aerogenerator blades (1, 2, 3) packing system for transporting, handling and storing of aerogenerator blades (1, 2, 3). The prior art does not provide for cost-effective packing systems for sets of three blades. One aspect of the invention is directed to a method of packing three aerogenerator blades (1, 2, 3) and other aspect is directed to a packing system comprising a root frame (4) and a binding frame (5), wherein the blades (1, 2, 3) are in a edgewise position.

4 Claims, 1 Drawing Sheet

US 8,622,670 B2

THREE AEROGENERATOR BLADES PACKING SYSTEM (PACKING METHOD AND PACKING SYSTEM FOR THREE AEROGENERATOR BLADES)

CROSS-REFERENCE TO RELATED APPLICATION

This patent application is a National Stage of International Patent Application No. PCT/IB2008/055475, filed on Dec. 19, 2008. The contents of which are incorporated herein by reference in their entirety.

TECHNICAL FIELD

This invention relates to the transporting, handling and storing of aerogenerator blades and more particularly to a packing system for transporting, handling and storing sets of three aerogenerator blades.

BACKGROUND ART

Wind power has emerged as a viable alternative to hydrocarbons and a highly competitive form of renewable energy. As a result, increased production of electrical power from wind energy is a global trend. Wind power is frequently produced by large generators comprising a vertical structure on top of which is located at least one horizontal axis wind turbine that includes one, two, three or multiple rotor blades. Wind power generators or 'aerogenerators' are designed to exploit wind energy existing at a particular location and therefore vary in height, control system, number of blades, blade orientation, and blade shape. Due to many reasons, aerogenerators with three blades have become the most widely adopted configuration in large applications.

Aerogenerators are often grouped together in wind parks. Hence, it is common for various aerogenerator blades to be shipped to one specific destination. In such a case, it is very much desirable to efficiently utilize the available transport space in order to minimize the number of transportation vehicles required to transport the plurality of rotor blades to the specific destination site. In addition, due to designs and manufacturing constraints, it is very difficult to manufacture a set of three, or even two, aerogenerators blades with absolutely identical characteristics, for instance, the perfectly identical total weight or profile distribution. Hence, after manufacturing a plurality of aerogenerator blades with the same projected characteristics, the manufacturer usually checks which are the groups of blades (usually sets of three as mentioned hereinabove) that share the most similar characteristics between them (counterbalance) in order to form the set of blades of each aerogenerator.

Furthermore, aerogenerator blades are often of large dimensions and peculiar geometry and thus demand special logistical accommodations during handling, transporting, and storing. In order to accommodate the large dimension of an aerogenerator blade, a transportation system must be compatible with standard equipment such as semi-trailer trucks, trains, ships and cranes. The system must further allow for the transportation and stabilization of blades larger than, for example, about 30 meters (about 99.4 feet) in length and about 2 meters (about 6.6 feet) in width. Moreover, the transportation and stabilization system must provide for adequate protection of the rotor blades, be cost-effective and comply with international transportation regulations.

Many systems and devices have been proposed that address the aforementioned problems associated with the handling, transporting, and storing of wind turbine rotor blades, for example, U.S. Pat. No. 6,983,844, US Patent Applications Publication Nos. 2005/0180833A1, 2006/0251517A1, 2007/0199847A1 and EP Patent Application Publication No. EP1997681A2. The U.S. Pat. No. 6,983,844 patent, for instance, describes a method of wind turbine blade packing where a first end of a blade is packaged in a first package and a second end of the blade is packaged in a second package, and where the tip of a first blade and the root of a second blade are placed in the immediate vicinity of each other during transportation of the aerogenerator blades.

DISCLOSURE OF INVENTION

Technical Problem

The solutions offered in the cited documents and in other prior art do not sufficiently address the numerous problems associated with the handling, transporting and storing of a plurality of aerogenerator blades. More particularly, the prior art does not provide for cost-effective packing systems for sets of three blades. It is very desirable to have a transportation system for sets of three blades, because as mentioned most wind farms adopt aerogenerators with three blades. Therefore, a need remains for a transportation system specially adapted for the handling, transporting, and storing of sets of three aerogenerator blades in a manner that efficiently utilizes the available transport space and provides adequate support and protection of the rotor blades, is cost-effective and complies with international transportation regulations.

Technical Solution

To overcome the drawbacks and problems described above and other disadvantages not mentioned herein, in accordance with the purposes of the invention, as embodied and broadly described herein, one aspect of the invention is directed to a method of packing three aerogenerator blades characterized by comprising packing a first aerogenerator blade in the vicinity of a second aerogenerator blade, wherein the first blade root region is positioned in the vicinity of the root region of the second blade, and the tip region of the first blade is positioned in the vicinity of the tip region of the second blade, said blades being positioned in an edgewise position; and packing a third aerogenerator blade in an edgewise position in the vicinity of the second aerogenerator blade, wherein the tip region of the third blade is positioned in the vicinity of the root region of the second blade, and the root region of the third blade is positioned in the vicinity of the tip region of the second blade.

In another aspect, particularly in case of transportation trucks, the first and second aerogenerator blades root regions and the tip of the third aerogenerator blade are packed towards the front side of the transportation means and the tip regions of the first and second blades and the root of the third blade are packed towards the rear side of the transportation means.

Another aspect of the invention is to provide a three aerogenerator blade packing system characterized by comprising a root frame adapted for fixing a first aerogenerator blade in the vicinity of a second aerogenerator blade, wherein the first blade root region is positioned in the vicinity of the root region of the second blade, and the tip region of the first blade is positioned in the vicinity of the tip region of the second blade, said blades being positioned in an edgewise position; a binding frame adapted for fixing a third aerogenerator blade in an edgewise position in the vicinity of the second aerogenerator blade, wherein the tip region of the third blade is positioned in the vicinity of the root region of the second blade, and the root region of the third blade is positioned in the vicinity of the tip region of the second blade.

In another aspect of the present invention, the root frame is adapted for fixing the tip region of the third blade.

In yet another aspect, the invention further comprises an intermediary support for fixing the tip region of the third aerogenerator blade in the vicinity of the second blade root region. In another aspect, the invention further comprises a beam connected to the root of the third blade and fixed to the binding frame by straps.

Further aspects, advantages and features of the present invention are apparent from this specification.

Advantageous Effects

The present invention has several advantages over the prior art. In particular, the novel packing system for sets of three aerogenerator blades of the present invention is compatible with standard transportation vehicles, including as semi-trailer trucks, ships and cranes. Furthermore, this packing system is very advantageous because instead of distributing the roots in the opposite direction from the tips, this inventions provides for a novel distribution of two vicinal roots per tip, and two tips per vicinal root, with the blades in edgewise position, what allows a surprisingly advantageous distribution of the loads and dimensions of the blades in the packing system while still maintaining a simple though strong packing system with a small number of components.

DESCRIPTION OF DRAWINGS

The accompanying drawings are not intended to be drawn on scale. In the drawings, each identical or nearly identical component that is illustrated in various figures is represented by a like numeral. For purposes of clarity, not every component may be labelled in every drawing.

MODE FOR INVENTION

This invention is not limited in its application to the details of construction and the arrangement of components set forth in this specification. The invention is capable of other embodiments and of being practiced or of being carried out in various ways. Other features and advantages of the present invention will become apparent in the following detailed description of the preferred embodiments. Also, the phraseology and terminology used herein is for the purpose of description and should not be regarded as limiting. The use of 'including', 'comprising', or 'having', 'containing', 'involving', and variations thereof herein, is meant to encompass the items listed thereafter and equivalents thereof as well as additional items.

Figure 1:
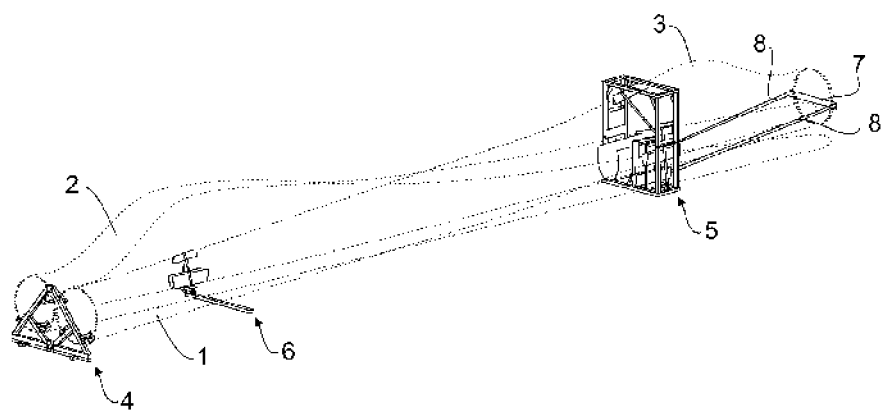
FIG. 01 is a perspective view of an exemplary packing system for three aerogenerator blades.
Figure 2:
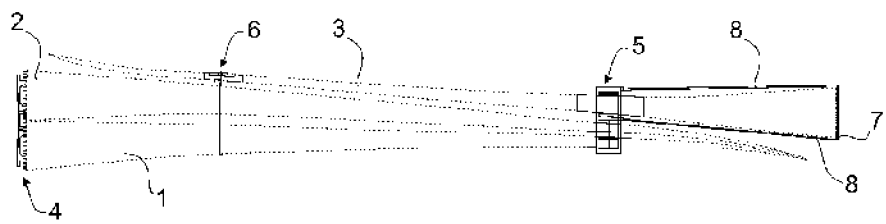
FIG. 02 is an upper view of an exemplary packing system for three aerogenerator blades.

FIG. 01 illustrates a perspective view of an exemplary packing system for three aerogenerator blades according to the present invention and FIG. 02 illustrates an upper view of this exemplary embodiment.

The three aerogenerator blades (1, 2, 3) packing system comprises a root frame (4) adapted for fixing a first aerogenerator blade (1) in the vicinity of a second aerogenerator blade (2), wherein the first blade (1) root region is positioned in the vicinity of the root region of the second blade (2), and the tip region of the first blade (1) is positioned in the vicinity of the tip region of the second blade (2), said blades being positioned in an edgewise position. The packing system further comprises a binding frame (5) adapted for fixing a third aerogenerator blade (3) in an edgewise position in the vicinity of the second aerogenerator blade (2), wherein the tip region of the third blade (3) is positioned in the vicinity of the root region of the second blade (2), and the root region of the third blade (3) is positioned in the vicinity of the tip region of the second blade (2).

The blade root region means the root end or the region near to the root end of the blade; while the tip region means the tip end or the region near the tip end. The region near to the root end and near to the tip end depends mainly on the structural design of each aerogenerator blade, which defines the points of handling and fixing the blades. The edgewise position means a vertical chord line or substantially vertical chord line position, in opposition to a flapwise (or 'flatwise') position in which the chord line is in a horizontal or substantially horizontal position.

As depicted in FIG. 01, the exemplary root frame (4) is a triangular frame, with internal reinforcing braces, connected to the first (1) and second (2) blade root rings. As depicted in the FIG. 01, by positioning the first (1) and second (2) blade root regions in the vicinity of each other, this packing system allows a very simple and small root frame (4) mounting configuration. In a further aspect, the root frame (4) can be separated in two parts, for each one connecting separately to the first (1) and second (2) blades for further coupling of the two root frame (4) parts.

In another alternative aspect of the present invention, (not shown in FIGS. 01 and 02) the root frame (4) is adapted for fixing the tip region of the third blade (3). Usually the tip end of an aerogenerator blade is more fragile, hence, it is not desirable to use the tip end for supporting the loads of the fixture of the blade; therefore, in yet another aspect, the invention further comprises an intermediary support (6) for fixing the third blade (3) tip region near the tip end, as shown in FIG. 01. The intermediary support (6) may optionally provide a secondary support (not shown in FIG. 01) for the blade root regions of the first (1) and second (2) blades.

As shown in FIG. 01, the binding frame (5) is adapted for fixing in an edgewise position the first (1) and second (2) blade tip regions and the root region of the third (3) blade. The root frame (1) comprises an upper section attachable to an under section for allowing the placement and further displacement of the blades; structural members such as columns, and additional braces if necessary; and members for supporting and fixing the blades, such as belts, strips, cushions, yokes and other suitable means. The root frame (1), the binding frame (5) and the intermediary support (6) may include additional internal or external structural and support members.

In another aspect, the packing system of the invention further comprises a pressure tray comprising a beam (7) connected to the root ring of the third (3) blade and fixed to the binding frame (5) by straps (8). The pressure tray provides additional stability to the packing system.

In another aspect, the present invention may be carried out by a method of packing three aerogenerator blades characterized by comprising packing a first aerogenerator blade (1) in the vicinity of a second aerogenerator blade (2), wherein the first blade (1) root region is positioned in the vicinity of the root region of the second blade (2), and the tip region of the first blade (1) is positioned in the vicinity of the tip region of the second blade (2), said blades being positioned in an edgewise position; and packing a third aerogenerator blade (3) in an edgewise position in the vicinity of the second aerogenerator blade (3), wherein the tip region of the third blade is positioned in the vicinity of the root region of the second blade (2), and the root region of the third blade (3) is positioned in the vicinity of the tip region of the second blade (2). In another aspect, particularly in case of transportation trucks, the first (1) and second (2) aerogenerator blades root regions and the tip of the third aerogenerator blade (3) is packed towards the front side of the transportation means and the tip regions of the first (1) of second (2) blades and the root of the third blade (3) is packed towards the rear side of the transportation means.

Although this packing system is directed to three aerogenerator blades, due to its versatile and modular configuration, it may be also used with only two aerogenerators blades. For instance, it may be possible to position two blades with the chord line in about 45 [deg.] degrees, reducing the total high of the combination.

While the invention has been disclosed by the detailed description above, the accompanying drawings and examples, various equivalents, modifications and improvements will be apparent to the person skilled in the art. Such equivalents, modifications and improvements are intended to be encompassed by the following claims.

The invention claimed is:

1. A packing system for aerogenerator blades, the packing system comprising
a root frame configured to hold a root portion of a first aerogenerator blade laterally adjacent to a root portion of a second aerogenerator blade, the first aerogenerator blade and the second aerogenerator blade being positioned in an edgewise position; and
a binding frame configured to hold a tip portion of the first aerogenerator blade laterally adjacent to a tip portion of the second aerogenerator blade and to hold a root portion of a third aerogenerator blade, in an edgewise position and laterally adjacent to the tip portion of the second aerogenerator blade,
wherein the root frame and the binding frame are thereby configured to hold the first aerogenerator blade directly adjacent to the second aerogenerator blade, with no additional element therebetween from the root portion of the first aerogenerator blade and the root portion of the second aerogenerator blade to the tip portion of the first aerogenerator blade and the tip portion of the second aerogenerator blade.

2. The packing system according to claim 1 wherein the root frame is further configured to hold a tip region of the third aerogenerator blade.

3. The packing system according to claim 1, further comprising: an intermediary support configured to hold a tip region of the third aerogenerator blade adjacent to the second aerogenerator blade.

4. The packing system according to claim 1 further comprising: a beam configured to hold the root portion of the third aerogenerator blade, and a plurality of straps connecting the beam to the binding frame.

* * * * *